United States Patent
Chuang et al.

(10) Patent No.: US 10,414,852 B2
(45) Date of Patent: Sep. 17, 2019

(54) BIOMASS THERMOPLASTIC POLYURETHANE

(71) Applicant: INDUSTRIAL TECHNOLOGY RESEARCH INSTITUTE, Hsinchu (TW)

(72) Inventors: Wen-Pin Chuang, Hsinchu (TW); Yi-Che Su, Zhubei (TW); Yun-Ya Huang, Hsinchu (TW); Chao-Chieh Chiang, Kaohsiung (TW); Cheng-Han Hsieh, Changhua (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/857,208

(22) Filed: Dec. 28, 2017

(65) Prior Publication Data

US 2019/0202971 A1    Jul. 4, 2019

(51) Int. Cl.
*C08G 18/00* (2006.01)
*C08G 61/04* (2006.01)
*C08G 18/64* (2006.01)
*C08G 18/48* (2006.01)
*C08G 18/75* (2006.01)

(52) U.S. Cl.
CPC ..... *C08G 18/6492* (2013.01); *C08G 18/4854* (2013.01); *C08G 18/755* (2013.01)

(58) Field of Classification Search
USPC .................... 528/77, 76, 44; 520/1
See application file for complete search history.

(56) References Cited

U.S. PATENT DOCUMENTS

| | | | |
|---|---|---|---|
| 9,593,221 B1 | 3/2017 | Kurple | |
| 9,598,529 B2 | 3/2017 | Langlois et al. | |
| 2015/0183948 A1* | 7/2015 | Chuang | C08J 9/0061 521/174 |
| 2016/0002466 A1 | 1/2016 | Erdmann et al. | |
| 2016/0002467 A1 | 1/2016 | Erdmann et al. | |
| 2016/0194433 A1 | 7/2016 | Langlois et al. | |
| 2017/0002129 A1 | 1/2017 | Grünbauer et al. | |
| 2017/0158802 A1 | 6/2017 | Chuang et al. | |

FOREIGN PATENT DOCUMENTS

| | | |
|---|---|---|
| CN | 101696261 A | 4/2010 |
| CN | 103224628 A | 7/2013 |
| CN | 105637036 A | 6/2016 |
| CN | 106366625 A | 2/2017 |
| CN | 106832173 A | 6/2017 |
| CN | 104744659 B | 1/2018 |
| DE | 196 48 724 A1 | 5/1998 |
| EP | 2 889 319 A1 | 7/2015 |
| TW | I500662 B | 9/2015 |
| TW | I560228 B | 12/2016 |

OTHER PUBLICATIONS

Jeong npl, Preparation and Characterization of Thermoplastic Polyurethane Using Partially Acetylated Kraft Lignin, 2013, Fibers and Polymers, vol. 14, No. 7, 1082-1093 (Year: 2013).*
Taiwan Office Action for Appl. No. 106146226 dated Mar. 22, 2018.
Duong et al., "High Molecular-Weight Thermoplastic Polymerization of Kraft Lignin Macromers with Diisocyanate", BioResources, vol. 9, No. 2, 2014, pp. 2359-2371.
Jeong et al., "Preparation and Characterization of Thermoplastic Polyurethanes Using Partially Acetylated Kraft Lignin", Fibers and Polymers, vol. 14, No. 7, 2013, pp. 1082-1093.
Zhang et al., "Renewable High-Performance Polyurethane Bioplastics Derived from Lignin-Poly (ε-Caprolactone)", ACS Sustainable Chem. Eng., vol. 5, 2017 (Apr. 2, 2017), pp. 4276-4284.

* cited by examiner

*Primary Examiner* — Jessica Whiteley
(74) *Attorney, Agent, or Firm* — Birch, Stewart, Kolasch & Birch, LLP

(57) ABSTRACT

A biomass-based thermoplastic polyurethane is provided. The biomass-based thermoplastic polyurethane is a reaction product of a composition. The composition includes 1-50 parts by weight of a modified lignin, 50-99 parts by weight of a first polyol, and 40-60 parts by weight of a diisocyanate. The modified lignin has an OH value of less than 3.0 mmol/g. The sum of the modified lignin and the first polyol is 100 parts by weight.

13 Claims, No Drawings

BIOMASS THERMOPLASTIC POLYURETHANE

TECHNICAL FIELD

The technical field relates a biomass-based thermoplastic polyurethane.

BACKGROUND

Thermoplastic polyurethane (TPU) has been widely applied in foam cushions, heat insulation panels, electronic potting gels, high-performance adhesives, surface coatings, packaging, surface sealants, and synthetic fibers, due to its flexibility and high elasticity.

Polyol, which used in manufacturing thermoplastic polyurethane, is generally prepared from petroleum products. However, in view of environmental issues, more and more industrial manufacturing methods that try to replace petroleum products with biomass products have been developed. In these, lignin as a biomass polyol can be extracted easily from food-grade and non-food grade biomass, such as agricultural waste or biomass in the forest. However, when subjecting lignin to directly react with isocyanate for preparing thermoplastic polyurethane, the reaction product would lose thermoplastic property due to cross-linking.

Therefore, the industry needs a novel lignin thermoplastic polyurethane to overcome the aforementioned problems.

SUMMARY

According to embodiments of the present disclosure, the present disclosure provides a biomass-based thermoplastic polyurethane, which is a reaction product of a composition, wherein the composition includes: 1-50 parts by weight of a modified lignin, 50-99 parts by weight of a first polyol, and 40-60 parts by weight of a diisocyanate. In particular, a hydroxyl value (OH value) of the modified lignin is less than 3 mmol/g and the sum of the modified lignin and the first polyol is 100 parts by weight.

A detailed description is given in the following embodiments with reference to the accompanying drawings.

DETAILED DESCRIPTION

Embodiments of the present disclosure provide a biomass-based thermoplastic polyurethane. Since the modified lignin (hydroxyl value (OH value) less than 3 mmol/g)), polyol and diisocyanate used in the preparation of the biomass-based thermoplastic polyurethane of the present disclosure are within a specific range, the obtained biomass-based thermoplastic polyurethane exhibits better mechanical strength and abrasion resistance. Furthermore, in the reaction obtained by subjecting unmodified lignin to react with a polyol and a diisocyanate, if the amount of the unmodified lignin is too high, the reaction product would lose thermoplastic property due to cross-linking. If the amount of the unmodified lignin is too low, the mechanical strength and abrasion resistance of the reaction product would not be non-obviously enhanced. Since the modified lignin having a hydroxyl value (OH value) of less than 3 mmol/g reacts with the polyol and the diisocyanate in the present disclosure, the increased amount of modified lignin will not cause cross-linking. Therefore, not only can the mechanical strength and abrasion resistance of the biomass-based thermoplastic polyurethane be significantly enhanced, but also thermoplastic property can be maintained.

According to embodiments of the present disclosure, the present disclosure provides a biomass-based thermoplastic polyurethane. The biomass-based thermoplastic polyurethane can be formed by reacting a composition. The composition includes: 1-50 parts by weight (such as 2-25 parts weight, 10-30 parts by weight, or 10-20 parts by weight) of the modified lignin, 50-99 parts by weight (such as 75-98 parts by weight, 70-90 parts by weight, or 80-90 parts by weight) of the first polyol, and 40-60 parts by weight (such as 45-55 parts by weight) of the diisocyanate. In particular, the hydroxyl value (OH value) of the modified lignin is less than 3 mmol/g and the sum of the modified lignin and the diisocyanate can be 100 parts by weight.

According to embodiments of the present disclosure, the modified lignin can have at least one end-capping functional group and the end-capping functional group bonds to a residual group eliminating hydrogen from hydroxyl group of the lignin. In particular, the end-capping functional group ($R^1$) is $C_{1-4}$ alkyl group, phenyl group,

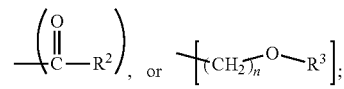

wherein $R^2$ and $R^3$ are independently $C_{1-4}$ alkyl group and n is 1, 2, 3 or 4.

According to embodiments of the present disclosure, the $C_{1-4}$ alkyl group can be linear or branched alkyl group. For example, the $C_{1-4}$ alkyl group can be methyl, ethyl, propyl, isopropyl, n-butyl, t-butyl, sec-butyl, or isobutyl.

According to embodiments of the present disclosure, said modified lignin of the present disclosure can have the structure represented by Formula (I)

wherein L is a residual group eliminating i hydroxyl groups from the lignin, $R^1$ is $C_{1-4}$ alkyl group, phenyl group,

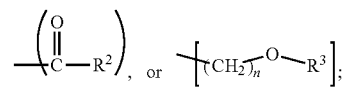

wherein $R^2$ and $R^3$ are independently $C_{1-4}$ alkyl group and n is 1, 2, 3 or 4; and, $3<i \leq 10$ (such as $3<i \leq 9$, $3<i \leq 7$, $3<i \leq 6$, $3<i \leq 5$, $3<i \leq 4.8$, $3<i \leq 4.6$, $3<i \leq 4.4$, $3<i \leq 4.2$, or $3<i \leq 4.0$).

According to embodiments of the present disclosure, the lignin for preparing the modified lignin can be sulfonated lignin, alkali lignin, or a combination thereof. According to embodiments of the present disclosure, the hydroxyl value (OH value) of the modified lignin can be from about 2 mmol/g to 2.9 mmol/g, such as from 2.1 mmol/g to 2.8 mmol/g, from 2.2 mmol/g to 2.7 mmol/g, or from 2.3 mmol/g to 2.6 mmol/g. If the hydroxyl value (OH value) of the modified lignin is too high, it would easily cause-cross-linking in the PU, resulting in a loss of thermoplastic property. If the hydroxyl value (OH value) of the modified lignin is too low, it would easily cause a product with low molecular weight and poor physical properties.

According to embodiments of the present disclosure, the first polyol is polymer polyol. According to embodiments of the present disclosure, the number average molecular weight of the first polyol can be from 500 to 100000, such as from 500 to 80000, from 1000 to 60000, from 2000 to 50000, or from 5000 to 40000.

According to embodiments of the present disclosure, the first polyol can be polyester polyol or polyether polyol. According to embodiments of the present disclosure, the polyester polyol can be poly(ethylene adipate) diol, poly(1,4-butylene adipate) diol, poly(ethylene dodecanoate) diol, or poly(1,6-hexathylene adipate) diol.

In addition, according to embodiments of the present disclosure, the polyether polyol can be polyethylene glycol (PEG), polypropylene glycol (PPG), or polytetramethylene ether glycol (PTMEG).

According to embodiments of the present disclosure, said composition of the present disclosure further includes a second polyol. In particular, the second polyol is different from the first polyol.

According to embodiments of the disclosure, the second polyol can be polyester polyol, polyether polyol, or polyol having 2-14 carbon atoms. For example, the second polyol can be poly(ethylene adipate) diol, poly(1,4-butylene adipate) diol), poly(ethylene dodecanoate) diol, poly(1,6-hexathylene adipate) diol, polyethylene glycol (PEG), polypropylene glycol (PPG), polytetramethylene ether glycol (PTMEG), ethylene glycol, 1,3-propylene glycol, glycerol, 1,4-butylene glycol, 1,5-pentylene glycol, neo-pentylene glycol, 1,6-hexylene glycol, 1,7-heptylene glycol, 1,8-octylene glycol, 1,9-nonylene glycol, decylene glycol, undecylene glycol, dodecylene glycol, tetradecylene glycol, rosin-diol, isosorbide, or 2,5-furandiol. According to embodiments of the present disclosure, the second polyol is polyester polyol or polyether polyol, and the number average molecular weight of the second polyol can be from 500 to 100000, such as from 500 to 80000, from 1000 to 60000, from 2000 to 50000, or from 5000 to 40000.

According to embodiments of the present disclosure, the weight ratio of the second polyol and the first polyol can be from 0.1 to 0.5 (such as 0.11, 0.13, 0.15, 0.2, 0.22, 0.25, 0.27, or 0.29), so that the mechanical strength, abrasion resistance, and hydrolysis resistance of said biomass-based thermoplastic polyurethane of the present disclosure can be simultaneously improved.

According to embodiments of the present disclosure, the first polyol can be polyester polyol and the second polyol can be polyol having 2-14 carbon atoms; the first polyol can be polyester polyol and the second polyol can be polyether polyol; the first polyol can be polyether polyol and the second polyol can be polyol having 2-14 carbon atoms; or, the first polyol can be polyether polyol and the second polyol can be polyester polyol.

According to embodiments of the present disclosure, the diisocyanate can be hexamethylene diisocyanate (HDI), methylene diphenyl diisocyanate (MDI), toluene diisocyanate (TDI), isophorone diisocyanate (IPDI), 1,5-naphthalene diisocyanate (NDI), p-phenylene diisocyanate (PPDI), or a combination thereof.

According to embodiments of the present disclosure, the composition can include two or more than two diisocyanates.

According to embodiments of the present disclosure, said modified lignin of the present disclosure can be prepared by the following steps. First, a reaction of the lignin and an alkali is performed to obtain a mixture. Next, a capping agent is added into the mixture to undergo a reaction, obtaining the modified lignin.

It should be noted that, in the present disclosure, the specific alkali is employed to selectively eliminate the hydrogen atoms from the —OH of aromatic hydroxyl group and thus the hydrogen atoms from the —OH of aliphatic hydroxyl group remains. Therefore, the number of capping functional groups bonded on the aromatic moiety of said modified lignin (i.e. the number of the capping functional groups replaces the hydrogen atom from the —OH of aromatic hydroxyl group) is greater than that of the capping functional groups bonded on the aliphatic moiety of said modified lignin (i.e. the number of the capping functional group replacing the hydrogen atom from the —OH of the aliphatic hydroxyl group).

According to embodiments of the present disclosure, the alkali can be sodium hydroxide, potassium hydroxide, cesium carbonate, potassium carbonate, or a combination thereof. According to embodiments of the present disclosure, the end-capping agent can be X—R$^1$, wherein X is halogen, and R$^1$ can be $C_{1-4}$ alkyl group, phenyl group,

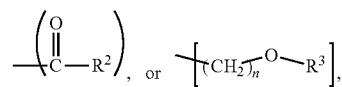

or wherein R$^2$ and R$^3$ are independently $C_{1-4}$ alkyl group and n is 1, 2, 3, or 4.

According to embodiments of the present disclosure, the process for preparing the modified lignin of the present disclosure includes heating the aforementioned composition to undergo a reaction and then ripening the result. According to embodiments of the present disclosure, the composition of the present disclosure can further include 0.1 to 5 parts by weight of catalyst. The catalyst can be organic bismuth catalyst, organic tin catalyst, or quaternary ammonium catalyst, wherein the sum of the modified lignin and the first polyol is 100 parts by weight.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

Preparation of the Modified Lignin

Preparation Example 1

100 parts by weight of lignin (Mw: 1000-1500, extracted from rice husk) was added into a reaction bottle and dissolved in acetone. After stirring well, 120 parts by weight of potassium carbonate was added into the reaction bottle at room temperature. Next, after stirring for 30 minutes, 140 parts by weight of methyl iodide was added into the reaction bottle to transform some hydroxyl groups of the lignin into methoxy groups. After reacting for 72 hours, a large quantity of water was added into the reaction bottle, and then a solid was deposited. Then, the result was filtrated and dried, obtaining Modified Lignin (1). Modified Lignin (1) was analyzed by nuclear magnetic resonance (NMR) spectroscopy to calculate the amount of residual hydroxyl group of Modified Lignin (1). The results are shown in Table 1.

Preparation Example 2

The process was performed according to Preparation Example 1 of preparing Modified Lignin (1), except that the reaction time was shortened from 72 hours to 24 hours, obtaining Modified Lignin (2). Modified Lignin (2) was analyzed by nuclear magnetic resonance (NMR) spectroscopy to calculate the amount of residual hydroxyl group of Modified Lignin (2). The results are shown in Table 1.

TABLE 1

|  | hydroxyl value of aliphatic hydroxyl | hydroxyl value of aromatic hydroxyl | sum of hydroxyl values |
| --- | --- | --- | --- |
| Lignin | 4.0 | 2.0 | 6.0 mmol/g |
| Modified Lignin (1) | 2.0 | 0.5 | 2.5 mmol/g |
| Modified Lignin (2) | 2.4 | 0.9 | 3.3 mmol/g |

Biomass-Based Thermoplastic Polyurethane

Example 1

10 parts by weight of Modified Lignin (1) and 90 parts by weight of polytetramethylene ether glycol (PTMEG) (manufactured and sold by Aldrich) (having a number average molecular weight of 1000-2000) were put into a reaction bottle. After heating to 80° C., moisture was removed under vacuum for 1 hour. After introducing argon into the reaction bottle, 13.5 parts by weight of 1,4-butanediol and 1 part by weight of organic bismuth catalyst (manufactured and sold by King Industries, with trade No. K348) were added into the reaction bottle. After stirring well, 46.68 parts by weight of isophorone diisocyanate (manufactured and sold by Bayer) was added into the reaction bottle and then the result was stirred. After heating the reaction bottle to 90° C.-100° C., the stirring was stopped and the reaction product was quickly transferred into a module. Next, the module was put into an oven at 80° C. After baking for 16 hours, Biomass-based Polyurethane (1) was obtained.

Next, Biomass-based Polyurethane (1) was dissolved in dimethyl acetamide, and then the result was used to form a film after baking in a low-temperature oven (at a baking temperature of 60-80° C.). After cutting the film into test pieces, the 100% modulus, tensile strength, and tensile elongation of each test piece was determined by universal rally machine according to ASTM D412. The results are shown in Table 2.

Example 2

The process was performed according to Example 1 of preparing Biomass-based Polyurethane (1), except that the amount of Modified Lignin (1) was increased from 10 parts by weight to 20 parts by weight and the amount of polytetramethylene ether glycol was reduced from 90 parts by weight to 80 parts by weight, obtaining Biomass-based Polyurethane (2). Next, Biomass-based Polyurethane (2) was dissolved in dimethyl acetamide, and then the result was used to form a film after baking in a low-temperature oven (at a baking temperature of 60-80° C.). After cutting the film into test pieces, the 100% modulus, tensile strength, and tensile elongation of each test piece was determined by universal rally machine according to ASTM D412. The results are shown in Table 2.

Comparative Example 1

100 parts by weight of polytetramethylene ether glycol (PTMEG) (manufactured and sold by Aldrich) (having a number average molecular weight of 1000-2000) was put into a reaction bottle. After heating to 80° C., moisture was removed under vacuum for 1 hour. After introducing argon into the reaction bottle, 13.5 parts by weight of 1,4-butanediol and 1 part by weight of organic bismuth catalyst (manufactured and sold by King Industries, with trade No. K348) were added into the reaction bottle. After stirring well, 46.68 parts by weight of isophorone diisocyanate (manufactured and sold by Bayer) was added into the reaction bottle and then the result was stirred. After heating the reaction bottle to 90° C.-100° C., the stirring was stopped and the reaction product was quickly transferred into a module. Next, the module was put into an oven at 80° C. After baking for 16 hours, Polyurethane (1) was obtained. Next, Polyurethane (1) was dissolved in dimethyl acetamide, and then the result was used to form a film after baking in a low-temperature oven (at a baking temperature of 60-80° C.). After cutting the film into test pieces, the 100% modulus, tensile strength, and tensile elongation of each test piece was determined by universal rally machine according to ASTM D412. The results are shown in Table 2.

Comparative Example 2

The process was performed according to Example 2 of preparing Biomass-based Polyurethane (2), except that Modified Lignin (1) was replaced with Modified Lignin (2). Since the reaction product was cross-linked and cured during the ripening process (90° C.-100° C.), the reaction product exhibited no thermoplastic property. As a result, a film could not be formed of the reaction product.

Comparative Example 3

The process was performed according to Example 2 of preparing Biomasss-based Polyurethane (2), except that Modified Lignin (1) was replaced with unmodified lignin (Mw: 1000-1500, extracted from rice husk) (hydroxyl value was 6.0 mmol/g). Since the reaction product was cross-linked and cured during the ripening process (90° C.-100° C.), the reaction product exhibited no thermoplastic property. As a result, a film could not be formed from the reaction product.

TABLE 2

|  | lignin | polytetramethylene ether glycol | butanediol | 100% modulus (Kg/cm$^2$) | tensile strength (Kg/cm$^2$) | tensile elongation (%) | thermoplastic |
| --- | --- | --- | --- | --- | --- | --- | --- |
| Example 1 | 10 parts by weight of Modified Lignin (1) | 90 parts by weight | 13.5 parts by weight | 32.56 | 437.95 | 1022.05 | yes |
| Example 2 | 20 parts by weight of Modified Lignin (1) | 80 parts by weight | 13.5 parts by weight | 68.33 | 476.67 | 707.09 | yes |

TABLE 2-continued

| | lignin | polytetra-methylene ether glycol | butanediol | 100% modulus (Kg/cm$^2$) | tensile strength (Kg/cm$^2$) | tensile elongation (%) | thermo-plastic |
|---|---|---|---|---|---|---|---|
| Comparative Example 1 | — | 100 parts by weight | 13.5 parts by weight | 13.11 | 275.38 | 1612.60 | yes |

As shown in Table 2, in comparison with Comparative Example 1, by means of the addition of Modified Lignin (1) (residual hydroxyl value was 2.5 mmol/g), the 100% modulus and tensile strength of the obtained biomass-based polyurethane can be significantly enhanced. Although tensile elongation of the obtained biomass-based polyurethane was reduced due to addition of Modified Lignin (1), the tensile elongation still remains greater than 700%.

Abrasion Resistance Test

The abrasion loss of Polyurethane (1) obtained in Comparative Example 1 and Biomass-based polyurethane (2) obtained in Example 2 of the present disclosure were determined according to DIN 53516. The results are shown in Table 3.

TABLE 3

| | Abrasion loss (mm$^3$) |
|---|---|
| Polyurethane (1) | 86.1 |
| Biomass-based Polyurethane (2) | 76.6 |

As shown in Table 3, the abrasion resistance of the obtained biomass-based polyurethane can be improved by adding the modified lignin of the present disclosure.

Hydrolysis Resistance Test

The Biomass-based Polyurethane (2) obtained in Example 2 of the present disclosure was subjected to a hydrolysis resistance test at 85° C. and 95% RH for 35 days (according to ASTM D882). The 100% modulus of Biomass-based Polyurethane (2) was measured during the hydrolysis test. The results are shown in Table 4. The 100% modulus variation was determined using the following equation:

$$100\% \text{ modulus variation} = \frac{\substack{100\% \text{ modulus measured} \\ \text{before the hydrolysis} \\ \text{resistance test}} - \substack{100\% \text{ modulus measured} \\ \text{after the hydrolysis} \\ \text{resistance test}}}{100\% \text{ modulus measured after the hydrolysis resistance test}} \times 100\%$$

TABLE 4

| | 100% modulus variation |
|---|---|
| Biomass-based Polyurethane (2) | ~0% |

As shown in Table 4, the biomass-based polyurethane of the present disclosure exhibits excellent weatherability by means of the addition of the modified lignin of the present disclosure. Furthermore, the mechanical properties of the biomass-based polyurethane of the present disclosure would not deteriorate, even under a high-temperature and -humidity environment.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A biomass-based thermoplastic polyurethane, which is a reaction product of a composition, the composition comprising:
    1-50 parts by weight of a modified lignin, wherein a hydroxyl value (OH value) of the modified lignin is from 2 mmol/g to 2.9 mmol/g;
    50-99 parts by weight of a first polyol, wherein the sum of the modified lignin and the first polyol is 100 parts by weight; and
    40-60 parts by weight of a diisocyanate.

2. The biomass-based thermoplastic polyurethane as claimed in claim 1, wherein the modified lignin has at least one end-capping group (R$^1$) and the end-capping group (R$^1$) bonds to a residual group eliminating hydrogen atom from hydroxyl group of the lignin, wherein the end-capping group (R$^1$) is C$_{1-4}$ alkyl group, phenyl group,

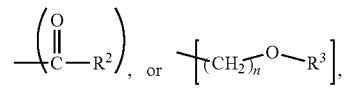

wherein R$^2$ and R$^3$ are independently C$_{1-4}$ alkyl group and n is 1, 2, 3, or 4.

3. The biomass-based thermoplastic polyurethane as claimed in claim 2, wherein the lignin is sulfonated lignin, alkali lignin, or a combination thereof.

4. The biomass-based thermoplastic polyurethane as claimed in claim 1, wherein the first polyol is a polymer polyol.

5. The biomass-based thermoplastic polyurethane as claimed in claim 4, wherein the first polyol is polyester polyol or polyether polyol.

6. The biomass-based thermoplastic polyurethane as claimed in claim 1, the composition further comprising a second polyol, wherein the second polyol is different from the first polyol.

7. The biomass-based thermoplastic polyurethane as claimed in claim 6, wherein the second polyol is polyester polyol, polyether polyol, or polyol having 2-14 carbon atoms.

8. The biomass-based thermoplastic polyurethane as claimed in claim 6, wherein the weight ratio of the second polyol to the first polyol is 0.1 to 0.5.

9. The biomass-based thermoplastic polyurethane as claimed in claim 8, wherein the first polyol is polyester polyol and the second polyol is polyol having 2-14 carbon atoms.

10. The biomass-based thermoplastic polyurethane as claimed in claim 8, wherein the first polyol is polyester polyol and the second polyol is polyether polyol.

11. The biomass-based thermoplastic polyurethane as claimed in claim 8, wherein the first polyol is polyether polyol and the second polyol is polyol having 2-14 carbon atoms.

12. The biomass-based thermoplastic polyurethane as claimed in claim 8, wherein the first polyol is polyether polyol and the second polyol is polyester polyol.

13. The biomass-based thermoplastic polyurethane as claimed in claim 1, wherein the diisocyanate is hexamethylene diisocyanate (HDI), methylene diphenyl diisocyanate (MDI), toluene diisocyanate (TDI), isophorone diisocyanate (IPDI), 1,5-naphthalene diisocyanate (NDI), p-phenylene diisocyanate (PPDI), or a combination thereof.

\* \* \* \* \*